United States Patent
Davies et al.

(10) Patent No.: US 9,568,634 B2
(45) Date of Patent: Feb. 14, 2017

(54) COIL WINDING METHODS FOR DOWNHOLE LOGGING TOOLS

(75) Inventors: Evan L. Davies, Spring, TX (US); Luis E. San Martin, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 122 days.

(21) Appl. No.: 14/237,674

(22) PCT Filed: Aug. 10, 2011

(86) PCT No.: PCT/US2011/047203
§ 371 (c)(1),
(2), (4) Date: Feb. 7, 2014

(87) PCT Pub. No.: WO2013/022442
PCT Pub. Date: Feb. 14, 2013

(65) Prior Publication Data
US 2014/0159731 A1    Jun. 12, 2014

(51) Int. Cl.
*G01V 3/30* (2006.01)
*G01V 3/28* (2006.01)

(52) U.S. Cl.
CPC .. *G01V 3/30* (2013.01); *G01V 3/28* (2013.01)

(58) Field of Classification Search
CPC ............. G01R 33/56341; G01R 33/3607; G01R 33/3635; G01R 33/3664; G01R 33/3808; H02K 5/132; H02K 9/19; H02K 3/50; E21B 47/122; E21B 43/128; E21B 36/04; E21B 17/028; E21B 3/02; E21B 47/0905; E21B 49/10; E21B 7/046; E21B 17/003; G01V 3/28; G01V 11/002; G01V 11/007

See application file for complete search history.

(56) References Cited

U.S. PATENT DOCUMENTS 4,489,276 A * 12/1984 Yu .......................... G01V 3/28
                                                    324/338
5,757,191 A     5/1998 Gianzero
(Continued)

FOREIGN PATENT DOCUMENTS

WO    WO-2013/022442    2/2013

OTHER PUBLICATIONS

CA Office Action, dated May 8, 2015, Appl No. 2,842,789, "Coil Winding Methods for Downhole Logging Tools, " filed Aug. 10, 2011, 4 pgs.

(Continued)

*Primary Examiner* — Alesa Allgood
(74) *Attorney, Agent, or Firm* — Iselin Law PLLC; Benjamin Fite

(57) ABSTRACT

A logging tool and method for winding a multi-component induction (MCI) antenna is presented. The method eliminates unwanted dipole signals that are created by the voltage drop that takes place in the transmitter. The antenna is made of at least two parts physically separated, one on each side of the mandrel. The winding method is performed in a way that creates at least four windings arranged to eliminate dipole signals attributable to an asymmetric voltage distribution. The midpoint of the conductive wire that for is the antenna windings may be electrically attached to the tool body. This method is suitable for the winding of the cross-components X and Y of the MCI coil arrays.

20 Claims, 5 Drawing Sheets

(56) References Cited

U.S. PATENT DOCUMENTS

| | | | |
|---|---|---|---|
| 6,734,675 B2 * | 5/2004 | Fanini | G01V 3/28 |
| | | | 324/339 |
| 6,769,499 B2 | 8/2004 | Cargill et al. | |
| 7,046,112 B2 | 5/2006 | Davies et al. | |
| 7,084,782 B2 | 8/2006 | Davies et al. | |
| 7,195,075 B2 | 3/2007 | San Martin et al. | |
| 7,579,841 B2 | 8/2009 | San Martin et al. | |
| 7,685,732 B2 | 3/2010 | Davies et al. | |
| 7,742,008 B2 | 6/2010 | Wang et al. | |
| 7,814,036 B2 | 10/2010 | Chen et al. | |
| 7,866,407 B2 | 1/2011 | San Martin et al. | |
| 7,888,941 B2 | 2/2011 | San Martin et al. | |
| 8,296,113 B2 | 10/2012 | San Martin | |
| 8,299,796 B2 | 10/2012 | San Martin et al. | |
| 8,362,780 B2 | 1/2013 | Rosthal et al. | |
| 2004/0183538 A1 * | 9/2004 | Hanstein | G01V 3/28 |
| | | | 324/339 |
| 2005/0189945 A1 * | 9/2005 | Reiderman | G01V 3/28 |
| | | | 324/333 |
| 2006/0181281 A1 * | 8/2006 | Moore | G01V 3/30 |
| | | | 324/338 |
| 2009/0302847 A1 * | 12/2009 | Knizhnik | G01V 3/18 |
| | | | 324/332 |
| 2011/0109311 A1 * | 5/2011 | Walsh | G01R 33/36 |
| | | | 324/309 |

OTHER PUBLICATIONS

EPO Extended Search Report, dated Jun. 26, 2015, Appl No. 11870725.6, "Coil Winding Methods for Downhole Logging Tools," filed Aug. 10, 2011, 7 pgs.

GCC Examination Report, dated Dec. 15, 2015 Coil Winding Methods for Downhole Logging Tools filed Aug. 8, 2012 Appln. No. 2012-21981, 6 pgs.

PCT International Search Report and Written Opinion, dated Dec. 16, 2011, Appl No. PCT/US2011/047203, "Coil Winding Methods for Downhole Logging Tools" filed Aug. 10, 2011, 9 pgs.

PCT International Preliminary Report on Patentability, dated Aug. 9, 2013, Appl No. PCT/US2011/047203, "Coil Winding Methods for Downhole Logging Tools", filed Aug. 10, 2011, 13 pgs.

* cited by examiner

FIG. 4A
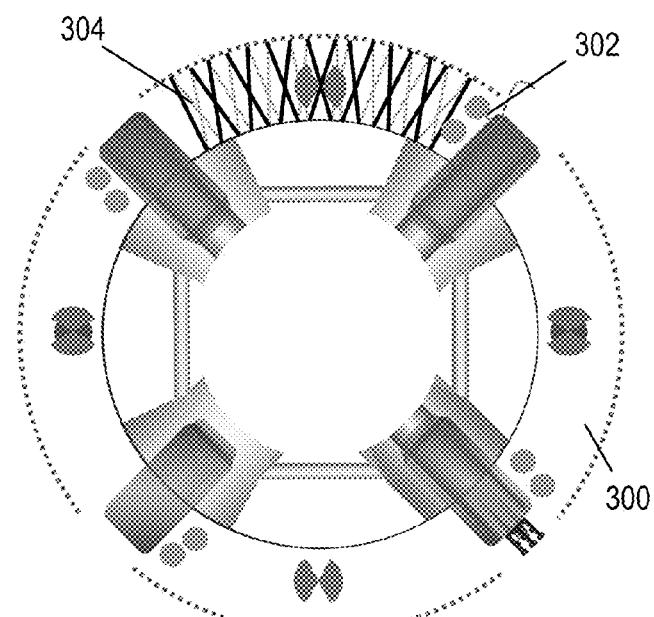
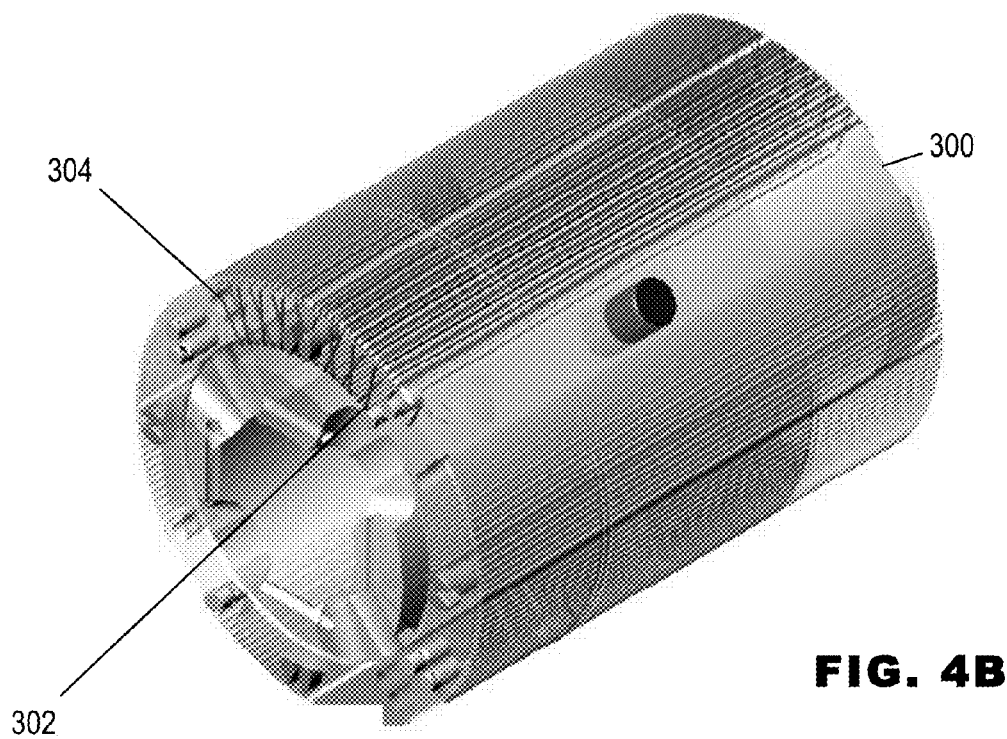
FIG. 4B

COIL WINDING METHODS FOR DOWNHOLE LOGGING TOOLS

BACKGROUND

Drillers and oil field operators use electromagnetic logging tools to measure a wide variety of subsurface formation parameters including, e.g., resistivity and nuclear magnetic resonance (NMR) responses. Such tools often energize a transmitter antenna with an alternating current to emit electromagnetic energy through the borehole fluid and into the surrounding formations. The emitted energy interacts with the borehole and formation to produce signals that are detected and measured by one or more receiver antennas. By processing the detected signal data, a profile of the formation can be determined. Such information is useful for well exploration and production.

The antennas on these tools are generally formed as multi-loop coils of conductive wire. The conductive wire sustains a voltage drop when the transmitters are driven and the signals are induced into the receivers. Depending on the winding pattern for the coils, such voltage drops can create an unwanted dipole signal that adversely affects the measurements. In addition, such voltage drops can cause undesirable cross-coupling between the antennas, further contaminating the tool's measurements. These issues do not appear to have been adequately addressed in tools having transverse (X- and Y-) antennas.

BRIEF DESCRIPTION OF THE DRAWINGS

A better understanding of the various disclosed system and method embodiments can be obtained when the following detailed description is considered in conjunction with the drawings, in which:

FIG. 4A is a top view of the form with an illustrative "x pattern" winding;

FIG. 4B is an isometric view of the form with the illustrative "x-pattern";

DETAILED DESCRIPTION

The issues identified in the background are at least in part addressed by the disclosed coil winding methods and patterns for downhole logging tools. At least one tool embodiment includes a logging tool that has an antenna for transmitting or receiving signals with a magnetic field component orthogonal to the tool axis. The antenna includes at least two portions arranged on opposite sides of a tool axis, and is formed from a conductive wire arranged to form at least two windings on each of the at least two portions. In operation, the conductive wire sustains a voltage distribution along its length that is symmetric about a midpoint of the conductive wire. The windings are arranged so that each winding on each portion of the antenna is matched by another winding on that portion having an equal and opposite voltage distribution. Preferably, at each point the conductive wire in each winding is separated from a corresponding point of the conductive wire in the matched winding in a direction that is substantially only radial, the corresponding points having substantially opposite voltages.

One illustrative antenna has at least eight windings arranged to eliminate any dipole signal attributable to an unbalanced distribution of voltages along the length of the antenna wire. These eight windings are coupled in series between first and second driving terminals for the antenna. The eight windings include a first and second winding positioned on one side of the tool, a third and fourth winding positioned on an opposite side of the tool, a fifth and sixth winding substantially collocated with the third and fourth winding, and a seventh and eighth winding substantially collocated with the first and second winding.

Figure 1:
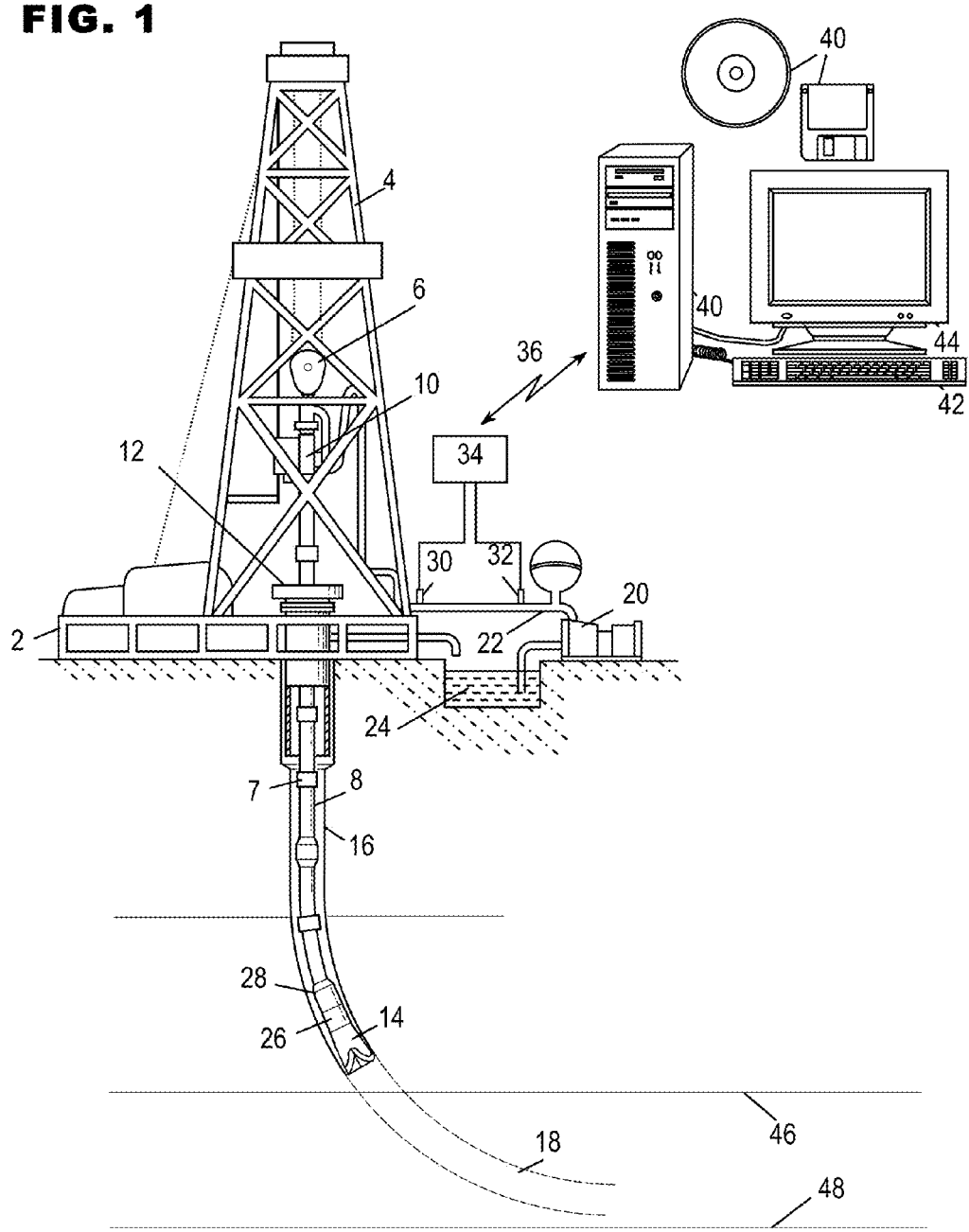
FIG. 1 shows an illustrative logging while drilling environment.

To further assist the reader's understanding of the disclosed systems and methods, we describe an environment suitable for their use and operation in FIG. 1. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formations. The drill bit 14 is just one piece of a bottom-hole assembly that typically includes one or more drill collars (thick-walled steel pipe) to provide weight and rigidity to aid the drilling process. Some of these drill collars may include logging instruments to gather measurements of various drilling parameters such as position, orientation, weight-on-bit, borehole diameter, resistivity, etc. Resistivity can be measured by electromagnetic logging tools, where the transmitter and receiver antennas are typically mounted with their axes along, or parallel to, the longitudinal axis of the tool. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used.

The system further includes a tool 26 to gather measurements of formation properties from which formation boundaries can be identified as discussed further below. Using these measurements in combination with the tool orientation measurements, the driller can steer the drill bit 14 along a desired path 18 relative to boundaries 46, 48 using any one of various suitable directional drilling systems, including steering vanes, a "bent sub", and a rotary steerable system. A pump 20 circulates drilling fluid through a feed pipe 22 to top drive 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity. Moreover, a telemetry sub 28 coupled to the downhole tools 26 can transmit telemetry data to the surface via mud pulse telemetry. A transmitter in the telemetry sub 28 modulates a resistance to drilling fluid flow to generate pressure pulses that propagate along the fluid stream at the speed of sound to the surface. One or more pressure transducers 30, 32 convert the pressure signal into electrical signal(s) for a signal digitizer 34. Note that other forms of telemetry exist and may be used to communicate signals from downhole to the digitizer. Such telemetry may employ acoustic telemetry, electromagnetic telemetry, or telemetry via wired drill pipe.

The digitizer 34 supplies a digital form of the pressure signals via a communications link 36 to a computer 38 or some other form of a data processing device. Computer 38 operates in accordance with software (which may be stored on information storage media 40) and user input via an input device 42 to process and decode the received signals. The resulting telemetry data may be further analyzed and processed by computer 38 to generate a display of useful information on a computer monitor 44 or some other form of a display device. Such useful information includes formation properties such as resistivity.

Figure 2:
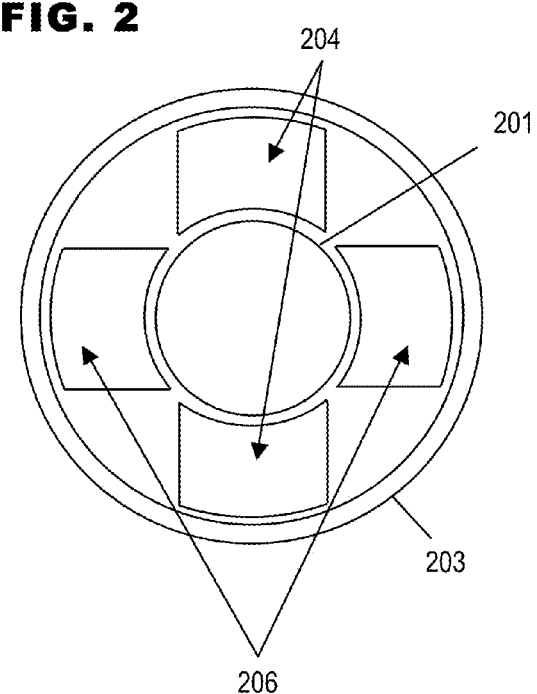
FIG. 2 is a schematic cross-section of an illustrative electromagnetic logging tool.

FIG. 2 is a cross-section of an illustrative multi-component induction tool. Multi-component array induction tools use transmitter and receiver coil-antennas disposed to excite fields at three non-parallel (usually orthogonal) directions. The tool includes a metal tube 201 that defines a central bore which can be used as a fluid flow path (for logging while drilling embodiments) or as a wire guide (for wireline tool embodiments). An outer sleeve 203 surrounds the tool and keeps out the borehole fluid. The sleeve 203 is preferably nonconductive, but could have conductive elements. The mandrel between the tube 201 and the sleeve 203 could be mainly metal. The mandrel is designed to accommodate a pair of antennas 204 oriented along an x-axis and a pair of antennas 206 along a y-axis. The antennas are provided in pairs to maximize their sensing areas while at the same time preserving their symmetry. Though the antennas in each pair can be coupled in parallel, a series coupling may be preferred.

Figure 3A:
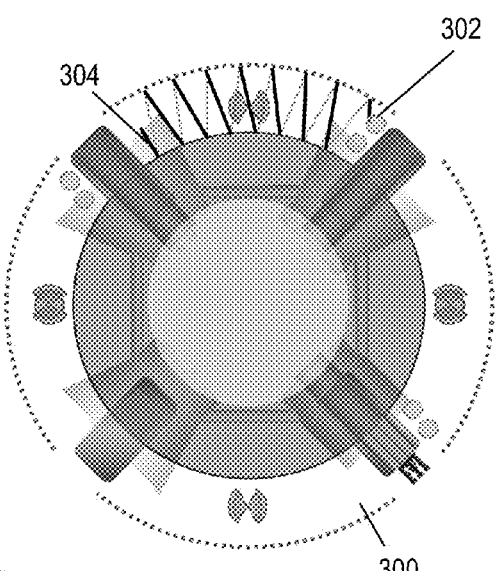
FIG. 3A is a top view of an illustrative antenna winding form.
Figure 3B:
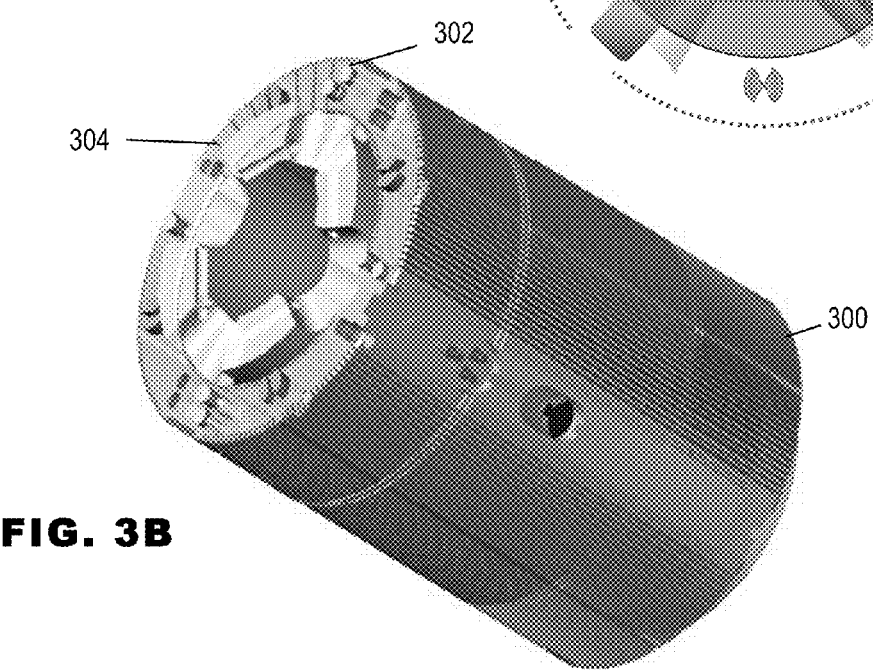
FIG. 3B is an isometric view of an illustrative antenna winding form.

FIGS. 3A and 3B show views of a mandrel 300 with grooves to accommodate the antenna windings. The windings for the antennas are preferably arranged so as to create a pattern of balanced voltages. FIGS. 3A-3B illustrate the beginning of the winding pattern, with a first winding beginning at 302 and ending at 304 of the top side of the mandrel 300. This portion of the mandrel will have four windings, which is believed to be the minimum number required to cancel unwanted dipole signals and to minimize the coupling between the different antenna orientations, if symmetry is to be enforced while still feeding each portion of the mandrel from a single wiring port. (If wiring ports are provided on both sides of each portion, the minimum number of windings drops to four.) Because four windings will occupy this space, each of the four windings will use every fourth groove, i.e., three grooves are left open between the turns of each winding.

Figure 5:
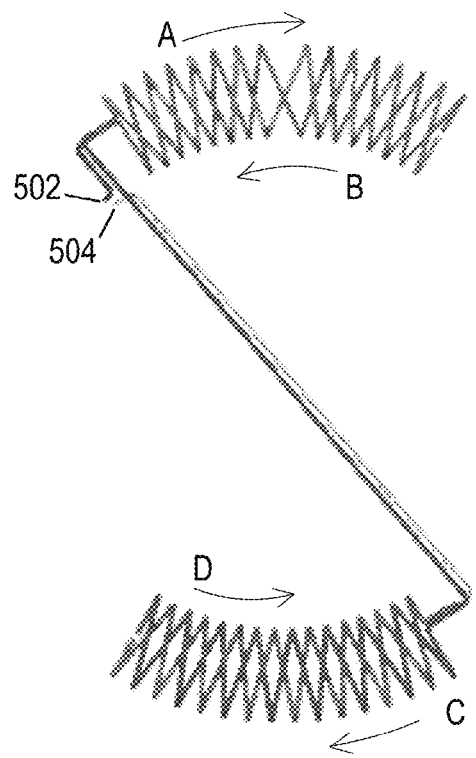
FIG. 5 shows an illustrative embodiment of the coil winding pattern when half-way complete.

FIGS. 4A and 4B show views of the mandrel 300 with a second winding added. Because this winding returns to the starting point of the last winding, it may be termed a "return winding". In the second winding, the wires are wound back in the opposite direction from side 304 to side 302, filling in the middle groove of the three available grooves. When the wires are wound back in the opposite direction, the second winding creates an "x-pattern" with the first winding as shown in FIGS. 4A and 4B. As the wires pass over the top and bottom sides of the mandrel, they cross to form repetitive representations of the alphabet letter "x". These two windings are represented in FIG. 5 as winding A and winding B. Winding A starts from the first antenna terminal 502, and winding B forms the x-pattern with winding A. From the end of winding B, the antenna wire runs diametrically across the tool to the opposite side of the mandrel. (In practice the wire may be routed around the outside of metal tube 201, but for explanatory purposes this issue is neglected here.)

FIG. 5 shows that winding C begins on the mandrel at a point diametrically opposite the beginning of winding A. It should be noted that the polarity of each winding's response to a horizontal magnetic field is the same, i.e., winding C's response to a field in the x-direction should add to the response of windings A and B. Proceeding in this manner, windings C and D are added as illustrated in FIG. 5. The turns of return winding D cross the turns of winding C to create the same x-pattern observed for windings A and B. The antenna wire from winding D is routed to a grounding point 504 adjacent to the first antenna terminal 502.

Figure 6:
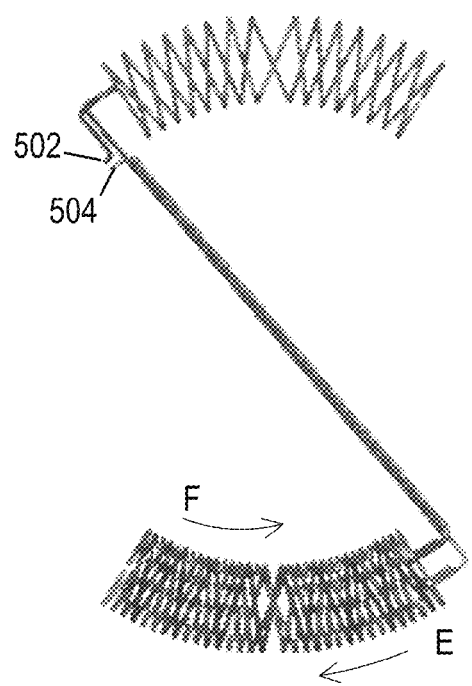
FIG. 6 shows the illustrative coil winding pattern at an intermediate stage.

If the winding pattern were to halt at this point, the operation of the antenna would create an electrical field, since the average voltage of windings A and B is higher than the average voltage of windings C and D. To balance the voltages and cancel the undesired electrical field, the winding pattern continues with the addition of four more windings. From the grounding point 504, the pattern continues with the addition of windings E and F as shown in FIG. 6. Windings E and F have the same x-pattern as observed previously, but they are offset from the x-pattern of windings E and F by one groove. The turns of windings C and D occupied every other groove, the remaining grooves are filled with the turns of windings E and F.

Figure 7:
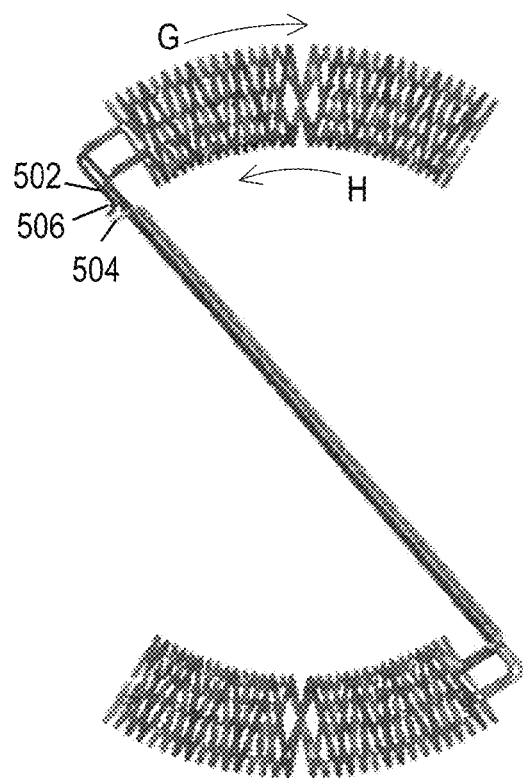
FIG. 7 shows the illustrative coil winding pattern when complete.

From the terminus of winding F, the antenna wire runs diametrically across the mandrel to add windings G and H as shown in FIG. 7. As with windings E and F, windings G and H form an x-pattern that is offset from the x-pattern of windings A and B by one groove. Winding H terminates at the second antenna terminal 506.

Figure 8:
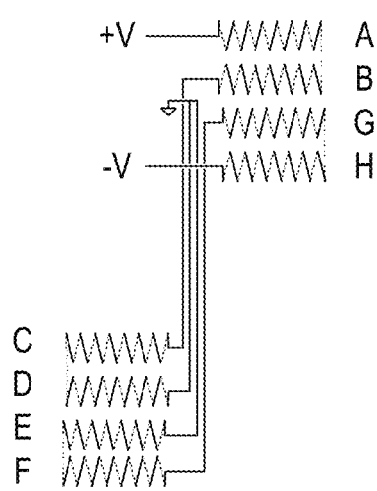
FIG. 8 shows an illustrative representation of the antenna windings that are vertically offset.

FIG. 8 shows a schematic representation of the antenna windings with the windings vertically offset to provide some clarity. Starting from the first antenna terminal, a single antenna wire is routed to provide windings A and B, across the tool to provide windings C and D, back to a ground point, then back across the tool to providing windings E and F (slightly horizontally offset from C and D), and then routed to provide windings G and H (slightly offset from windings A and B) before reaching the second antenna terminal. If the voltage applied to the antenna is assumed to drop uniformly along the length of the antenna wire, the voltage in the windings can be expressed (where the x-axis always points to the right and ranges from 0 to L):

$$V_A(x) = V\left(1 - \frac{x}{4L}\right) \quad V_B(x) = V\left(\frac{1}{2} + \frac{x}{4L}\right)$$

$$V_C(x) = V\left(\frac{1}{4} + \frac{x}{4L}\right) \quad V_D(x) = V\left(\frac{1}{4} - \frac{x}{4L}\right)$$

$$V_E(x) = V\left(-\frac{1}{4} + \frac{x}{4L}\right) \quad V_F(x) = V\left(-\frac{1}{4} - \frac{x}{4L}\right)$$

$$V_G(x) = V\left(-\frac{1}{2} - \frac{x}{4L}\right) \quad V_H(x) = V\left(-1 + \frac{x}{4L}\right)$$

Observe that the voltage for the four windings A, B, G, H, and the voltage for the four windings C, D, E, F cancel:

$$V_A(x) + V_B(x) + V_G(x) + V_H(x) = 0$$

$$V_C(x) + V_D(x) + V_E(x) + V_F(x) = 0$$

Accordingly, no electric field is created between the two sets of windings.

The foregoing winding pattern provides one orthogonally-oriented antenna along, e.g., the x-axis. The y-axis antenna can be wound in a similar manner that is rotated 90° from the first antenna. A z-axis antenna can be added by wrapping a co-axial coil with a two-layer winding pattern (having a first winding and a return winding over the first) around the mandrel over or beneath the windings for the x- and y-axis antennas. The disclosed arrangements offer voltage cancellation to eliminate a undesired electrical dipole signal and to eliminate cross-coupling between the orthogonal antennas. The positioning of the grounding point (physically, not electrically) near the antenna terminals provides further insurance against ground currents and static fluctuations. Electrically, the grounding point is midway along the length of the wire to ensure that winding voltages cancel out as described above.

Additional windings can be added by duplicating the given pattern and coupling it in parallel or series with the original. Some simplification is possible by eliminating two of the return windings and their matching windings, e.g., windings B, D, E, G could be eliminated to provide a balanced four-winding configuration at the cost of requiring additional wiring ports. So long as each winding is matched by a corresponding winding having an equal and opposite voltage distribution, the electrical field signals will be suppressed. The foregoing winding principles can be used for transmitting antennas, receiving antennas, and antennas that operate for both transmitting and receiving. It can be employed in resistivity logging tools, nuclear magnetic logging tools, or any downhole tool that employs an antenna oriented orthogonal to the longitudinal axis of the tool. These and other variations, equivalents, and modifications will become apparent to those skilled in the art once the above disclosure is fully appreciated. It is intended that the following claims be interpreted to embrace all such variations and modifications.

What is claimed is:

1. A logging tool having an antenna for transmitting or receiving signals with a magnetic field component orthogonal to a longitudinal tool axis, the antenna including at least two portions arranged on opposite sides of the longitudinal tool axis, the antenna comprising:
    a conductive wire that forms at least four separate multi-loop windings in series between a first driving terminal that provides a positive voltage and a second driving terminal that provides a negative voltage equal in magnitude to the positive voltage, the at least four windings include at least two windings on each of the at least two portions, the conductive wire sustaining a voltage distribution along its length during operation of the antenna, the voltage distribution being symmetric about a grounded midpoint of the conductive wire, and the windings being arranged so that each winding on each portion of the antenna is matched by another winding on that portion having an equal and opposite voltage distribution.

2. The tool of claim 1, wherein each point of the conductive wire in each winding is separated from a corresponding point of the conductive wire in the matched winding in a direction that is substantially only radial, the corresponding points having substantially opposite voltages.

3. The tool of claim 1, wherein the antenna has no more than two portions, each portion having four windings for a total of eight windings, the eight windings of the conductive coil coupled in series between a first and second antenna the first and second driving terminals, the eight windings including a first and second winding positioned on one side of the tool, a third and fourth winding positioned on an opposite side of the tool, a fifth and sixth winding substantially collocated with the third and fourth winding, and a seventh and eighth windings substantially collocated with the first and second winding.

4. The tool of claim 3, wherein the second winding has substantially the same number of turns as the first winding, and wherein the eighth winding has substantially the same number of turns as each of the second and seventh windings.

5. The tool of claim 4, wherein the fourth winding has substantially the same number of turns as the third winding, and wherein the sixth winding substantially the same number of turns as each of the fourth and fifth windings.

6. The tool of claim 5, wherein the third, fourth, fifth, and sixth windings each have substantially the same number of turns as each of the first, second, seventh, and eighth windings.

7. The tool of claim 6, further comprising a grounding connection between the fourth and fifth windings at said midpoint, the grounding connection being electrically attached to the tool body.

8. The tool of claim 1, wherein the midpoint is grounded using a grounding connection that is electrically attached to the tool body.

9. The tool of claim 8, wherein the first and second driving terminals are proximate to the grounding connection.

10. The tool of claim 1, wherein said antenna is hereafter termed the first antenna, wherein said magnetic field component is also orthogonal to a second magnetic field component of signals that are transmitted or received by a second antenna in said tool, the second antenna having a conductive wire arranged similarly to the conductive wire of the first antenna, but differing in orientation from the first antenna.

11. The tool of claim 10, further comprising a third antenna co-axial with the tool and operating to transmit or receive signals with a magnetic field component parallel to the longitudinal tool axis.

12. A multi-component array logging method comprising:
    arranging a conductive wire to form an antenna with at least four separate multi-loop windings in series between a first driving terminal that provides a positive voltage and a second driving terminal that provides a negative voltage equal in magnitude to the positive voltage, the antenna transmitting or receiving signals with a magnetic field component orthogonal to a longitudinal tool axis, and the antenna having at least two portions arranged on opposite sides of the longitudinal tool axis, each portion having at least two of the at least four windings: and attaching opposite ends of the conductive wire to first and second driving terminals; and operating the antenna in a manner that creates a voltage distribution along the conductive wire's length, the voltage distribution being symmetric about a grounded midpoint of the conductive wire so as to cause the voltage distribution along each winding on each portion of the antenna to be matched by a substantially equal and opposite voltage distribution on another winding on that portion.

13. The method of claim 12, wherein said arranging includes matching the windings on each portion so that each point of the conductive wire in each winding is separated from a corresponding point of the conductive wire in the matched winding in a direction that is substantially only radial, the corresponding points have substantially opposite voltages.

14. The method of claim 12, further comprising grounding the midpoint by electrically connecting it to the tool body.

15. The method of claim 12, wherein the antenna has no more than two portions, and wherein said arranging includes providing each portion with four windings for a total of eight windings, the eight windings of the conductive wire coupled in series between the first and second driving terminals, the eight windings including a first and second winding positioned on one side of the tool, a third and fourth winding positioned on an opposite side of the tool, a fifth and sixth winding substantially collocated with the third and fourth winding, and a seventh and eighth windings substantially collocated with the first and second winding.

16. The method of claim 15, wherein the second winding has substantially the same number of turns as the first winding, and wherein the eighth winding has substantially the same number of turns as each of the second and seventh windings.

17. The method of claim 16, wherein the fourth winding has substantially the same number of turns as the third winding, and wherein the sixth winding has substantially the same number of turns as each of the fourth and fifth windings.

18. The method of claim 17, wherein the third, fourth, fifth, and sixth windings each have substantially the same number of turns as each of the first, second, seventh, and eighth windings.

19. The method of claim 12, further comprising arranging a second conductive wire to form a second antenna for transmitting or receiving signals with a second magnetic field component orthogonal to said magnetic field component and the longitudinal tool axis, the second antenna having at least two portions arranged on opposite sides of the longitudinal tool axis, each portion having at least two windings.

20. The method of claim 19, further comprising arranging a third conductive wire to form a third antenna coaxial with the longitudinal tool axis.

* * * * *